United States Patent [19]

Calvert et al.

[11] Patent Number: 4,806,579

[45] Date of Patent: Feb. 21, 1989

[54] POLYMER COMPOSITES

[75] Inventors: Paul D. Calvert, Lewes; Raymond M. Ellul, Blackboys; Brian D. Moyle, Lewes, all of England

[73] Assignee: The British Petroleum Co. p.l.c., London, England

[21] Appl. No.: 7,002

[22] Filed: Jan. 23, 1987

[30] Foreign Application Priority Data

Jan. 30, 1986 [GB] United Kingdom ............... 8602318
May 20, 1986 [GB] United Kingdom ............... 8612283

[51] Int. Cl.$^4$ .................... C08K 5/34; C08K 5/21; C08K 3/10; C08K 3/32
[52] U.S. Cl. .................... 524/99; 428/323; 524/211; 524/216; 524/259; 524/401; 524/408; 524/414; 524/416; 156/600; 264/291
[58] Field of Search ............... 428/323, 910, 913; 524/259, 211, 216, 99, 408, 401, 414, 416

[56] References Cited

U.S. PATENT DOCUMENTS 2,935,471 5/1960 Aarons et al. ............... 524/416
4,454,277 6/1984 Heger ............... 524/211
4,579,894 4/1986 Bertelli et al. ............... 524/416

OTHER PUBLICATIONS

Hulme; Nonlinear Optical Crystals and their Applications; Reports on Progress in Physics; vol. 36, Part 2; pp. 499 et seq.; 1973.

Nayar; Nonlinear Optical Interactions in Organic Crystal Cored Fibers; ACS Symposium Series 233; 1983.
Kurtz et al.; A Powder Technique for the Evaluation on Non-linear Optical Materials; J. Appl. Phys.; vol. 39, No. 8, 3798; 1968.
Bey; Phase Matched Optical Harmonic Generation in Liquid Media Employing Anomalous Dispersion; IEEE J. Quan. Elect.; vol. QE-4, No. 11; 1968.
Kardos et al.; The Potential Mechanical Response of Macromolecular Systems-A Composite Analogy; Poly. Eng. & Sci.; 1975; vol. 15, No. 3.
Albers; The Growth and The Degree of Dispersion of In Situ Composites; Acta Electronica, 17, 1; 1974.
Carpay et al.; In Situ Growth of Composites From The Vitreous State; J. Crystal Growth; 24/25; 1974.
Kovacs et al.; Subsurface Particulate Film Formation in Softenble Substrates: Present Status and Possible New Applications; *Thin Solid Films;* 100; 1983.
Chang; Crystallization Studies on Fire-Retardant Polypropylene; Jr. Ap. Polymer Sci.; vol. 21; 1977.
"Nonlinear Optical Properties of Organic and Polymeric Crystals", A. Garito; Dept. of Physics, Univ. of Pennsylvania.

*Primary Examiner*—Lewis T. Jacobs
*Attorney, Agent, or Firm*—Brooks, Haidt, Haffner & Delahunty

[57] ABSTRACT

A polymer matrix has grown therein in vitro and in situ non-centrosymmetric crystals of organic or inorganic compounds. The crystals are preferably orientated and may be used in electro-optical systems.

7 Claims, 9 Drawing Sheets

ANGULAR DEPENDENCE OF SECOND HARMONIC GENERATION FOR
2-METHYL-4-NITROANILINE / AND meta-NITROANILINE /
POLYSTYRENE COMPOSITES
TRANSMISSION DIRECTION IS 180°

ANGULAR DEPENDENCE OF SECOND HARMONIC GENERATION FOR
POTASSIUM DIHYDROGEN ORTHOPHOSPHATE /
POLY(ETHYLENE OXIDE) COMPOSITE

SECOND HARMONIC GENERATION AGAINST COMPOSITION FOR meta-NITROANILINE / POLY(ETHYLENE OXIDE) COMPOSITES ANGULAR DEPENDENCE OF SECOND HARMONIC GENERATION FOR meta-NITROANILINE / POLY(ETHYLENE OXIDE) COMPOSITES

POLYMER COMPOSITES

The present invention relates to polymer composites comprising polymeric matrices in which crystallites of organic or inorganic compounds have been grown in-situ.

It is well known that non-centrosymmetric crystals of some organic or inorganic compounds exhibit second order, non-linear optical properties. By 'non-centrosymmetric crystals' is meant here and throughout the specification crystals with crystallographic space groups which lack a centre of inversion symmetry.

Such second order, non-linear optical properties include for instance second harmonic generation (SHG), which is the ability of certain crystals to emit radiation, e.g. light, of a frequency which is double the frequency of the beam incident on said crystal. The frequency-doubled light for instance has many uses, a common one being the pumping of dye lasers in the laboratory.

Examples of non-centrosymmetric crystals capable of exhibiting such properties include potassium dihydrogen orthophosphate (KDP) and ammonium dihydrogen orthophosphate (ADP). These crystals can multiply the frequency of incident infra-red or visible light. However, such crystals are expensive to make, are fragile and have relatively low coefficients for SHG necessitating the use of high input beam powers.

With the growth in integrated optics and associated fibre-optic communications there is a need for tough, flexible, highly efficient and physically compatible frequency doubling systems.

It has now been found that such a need might be met substantially by growing non-centrosymmetric crystals in a polymer matrix.

Accordingly, the present invention provides a polymer matrix having grown therein in vitro and in situ, non-centrosymmetric crystals of organic or inorganic compounds.

Figure 1:
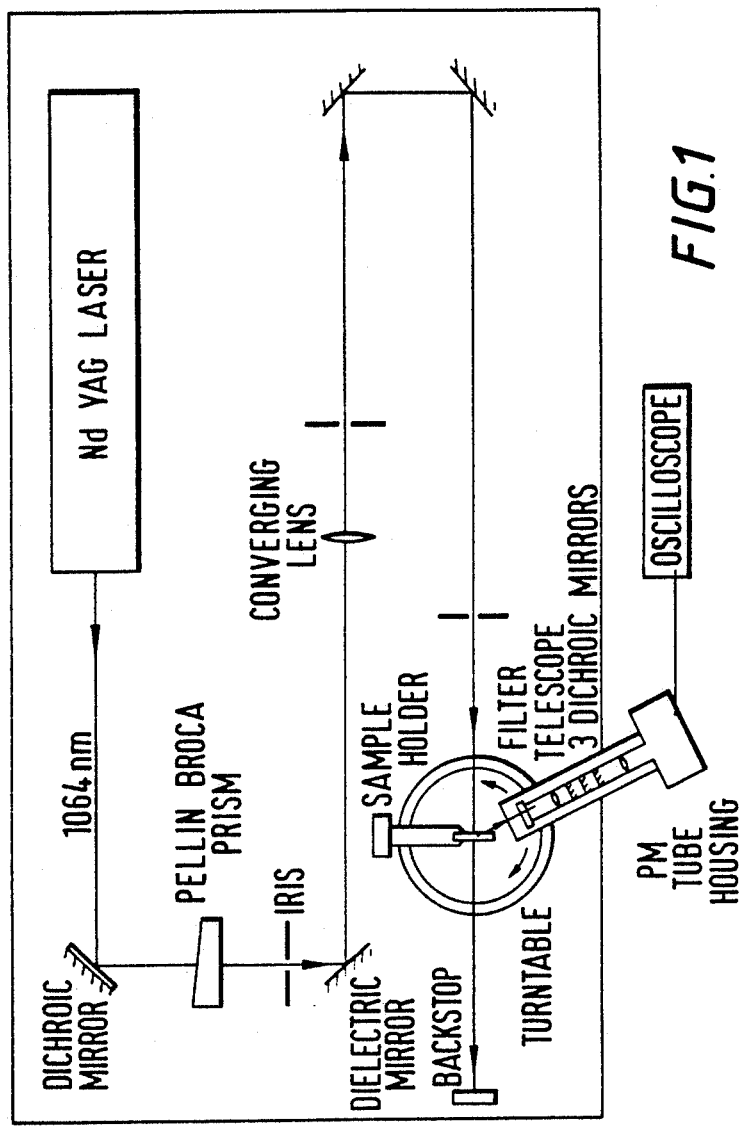
FIG. 1 is a diagrammatic representation of the apparatus for Second Harmonic Generation (SHG) measurements.

The term in vitro is used in the biological sciences to refer to operations carried out in an artificial system, e.g. in a test tube or reactor, as opposed to in vivo in a living biological system. It does not necessarily imply that the operation is carried out in glass apparatus (even though glass apparatus is commonly used for biological systems). Similarly, the term in vitro used in this specification is to be understood as indicating an operation carried out in a non-living system.

The term "polymer" as used herein is meant to include both homopolymers and copolymers.

The polymer matrix referred to herein is suitably in film form, preferably a thin film form. The films may have a thickness of up to 1 mm or more.

Thus, the polymer chosen for the matrix may be any polymer capable of being formed into a film. Examples of polymers that can be used include polystyrene, polyethylene, polymethylmethacrylate, polypropylene, ethylene-ethyl acrylate copolymers, polyvinyl chloride, polyvinylidene fluoride and polyoxyalkylene oxides such as polyethylene oxide.

Compounds capable of forming non-centrosymmetric crystals are organic or inorganic compounds. It is preferable that such compounds are capable of forming crystals under ambient conditions.

Examples of organic compounds capable of forming non-centrosymmetric crystals include 3-nitroaniline, 3-methyl-4-nitropyridine-1-oxide, 2-methyl-4-nitroaniline, urea and 2,4-dinitroaniline.

Examples of inorganic compounds capable of forming non-centrosymmetric crystals include KDP, ADP, lithium niobate, barium sodium niobate, lithium iodate and silicon dioxide.

A feature of the invention is that the non-centrosymmetric crystals are grown in vitro and in situ in the polymer matrix. This may be achieved for instance by high temperature extrusion of polymer pellets in which the organic or inorganic compounds to be crystallised have been dissolved e.g. by melt blending. The extrusion temperature is preferably just above the melting point of the higher melting of the two components.

Alternatively, such crystals can be grown in situ in the polymer matrix by dissolving the organic or inorganic compound to be crystallised and the matrix polymer in a common solvent and then casting the solution into the desired shape e.g. a film on a substrate e.g. glass thereby allowing the compound to crystallise in situ in the matrix upon gradual evaporation of the solvent.

In a further method, a substrate e.g. glass slide may be dipped into a common solution of the matrix polymer and the compound to be crystallised and then the solvent is allowed to evaporate from the dipped substrate. The process may be repeated several times to achieve the desired crystal density or film thickness.

In yet another process the crystals may be grown in situ in the polymer matrix by precipitation. In this technique a solution of a first compound and the matrix polymer is cast into a film, the film is then dipped into a solution of a second compound. The desired crystals may then be formed in the polymer matrix in situ either by a reaction between the first and second compounds or by the displacement of the first compound from the film by the second compound which may be the one of which crystals are to be formed.

The specific technique chosen will depend upon several factors such as the nature of the polymer matrix, the crystals desired, the solubility of the components in any given solvent, the thickness of the polymer or the crystal density of the composite.

Whichever of the aforementioned techniques is used to grow the non-centrosymmetrical crystals in the polymer matrix, it is also highly desirable to orient the crystals grown in the polymer matrix so that all the crystals are substantially in parallel alignment. It is expected that this will be essential if the composite is to act as a single crystal with respect to its electro-optical properties.

The orientation of the crystals in the polymer matrix may be achieved by several well known methods such as (a) stretching the composite during cooling after formation thereof by the melt-blending process, (b) cold-drawing the composite, (c) by subjecting the composite to an appropriate electrical field optionally accompanied or preceded by drawing, (d) by crystallisation of the composite in a stationary or mobile temperature gradient, or (e) by swelling an oriented matrix polymer with a solution of the compound which is then allowed to crystallise.

The simple, non-linear optical activity of these composites was tested using a neodymium-yttrium aluminium garnet (Nd-YAG) laser. It was found indeed that such composites are capable of multiplying the frequency of incident radiations.

The polymer composites of the present invention may be used in a wide variety of applications embracing devices responsive to magnetic, dichroic, electro-optic, birefringent, piezo-electric, piezoresistive, pyroelectric and of course the non-linear SHG types. The type of crystals grown in vitro in situ in the matrix govern the suitability of the composite for a given end use.

The present invention is further illustrated with reference to the following Examples.

EXAMPLE 1

Second harmonic generating (SHG) composites were prepared by incorporating 3-nitroaniline (mNA) or 2-methyl-4-nitroaniline (MNA) into polystyrene (PS) or polymethylmethacrylate (PMMA). Solutions of mNA or MNA and polymer were prepared by dissolving 10 g of solid e.g. 3 g mNA+7 g PS or 1 g mNA+9 PS into 100 ml of toluene and heating under reflux until the polymer and mNA or MNA had dissolved. From these solutions a series of mNA/PS, mNA/PMMA, MNA/PS and MNA/PMMA composites were prepared by dipping a microscope slide into the solution and allowing the solvent to evaporate from the slide. Due to the limited solubility of mNA, hot solutions were employed for all the composites prepared by slide dipping. Slides were held in the mNA/polymer solutions which were at 70° C. until they had reached the solution temperature and then removed and the solvent left to evaporate at 60° C. Similarly, the MNA/polymer solutions were held at 92° C. MNA/polymer and mNA/polymer films produced by this method were all 5±1 micrometers in thickness.

SHG measurements were made using a Spectron SL2Q Nd-YAG laser operating at 1.06 micrometers. the green 532 nm emission was detected by a Hamatsu 1P28 photomultiplier coupled to a Hewlett Packard 1744A 100 MHz storage oscilloscope. The oscilloscope monitored the photomultiplier current as a voltage across a 1 mega ohm resistance. The photomultiplier was fitted with a telescope such that light was accepted over an angular range of +/−5° at a distance of 10 cm from the sample. The illuminated area of the sample was 1 mm$^2$. A series of filters and dichroic mirrors in the viewing telescope were used to eliminate the 1.06 microns radiation transmitted by the sample. A diagrammatic representation of the apparatus is shown in FIG. 1. The samples were mounted with the films between glass slides and covered by a layer of paraffin oil in order to reduce surface scattering effects. In the absence of any crystalline sample, no SHG signal was detected. Microphotographs of mNA/polymer and MNA/polymer composites prepared by solution dipping were examined and found to exhibit a range of crystal structures depending upon the percentage of mNA or MNA present and the rate and method of solvent evaporation.

Partial alignment of the mNA/PS composite was achieved by placing warmed 30% by weight mNA in polystyrene dissolved in toluene solution onto a spin coater and spinning at maximum acceleration to 4000 rpm for 20 s. As the solution was thrown out to the edge of the 10 cm diameter circular glass disc it cooled and lost solvent causing mNA crystals to precipitate. The precipitated crystals were then aligned by the centrifugal movement of the solution. Microphotographs of these crystals were also examined and the crystals were found to be in alignment.

The damage resistance of the polymer composites to 1064 nm Nd-YAG radiation was also checked. It was found that most polymers were highly resistant (0.5 mm films).

EXAMPLE 2

Composites of potassium dihydrogenorthophosphate (KDP) and ammonium dihydrogenorthophosphate (ADP) in polyethyleneoxide (PEO) were also prepared. Both KDP and ADP have a non-centrosymmetric crystal structure. Since PEO, KDP and ADP are water soluble, this was used as a solvent for the preparation. These composites were made by first making up different percentage solutions of PEO in water, adding KDP or ADP and slowly evaporating. Two methods of evaporation were used: namely (a) simple evaporation of a film cast onto a slide in an oven or at ambient temperature and (b) preferential evaporation by placing the slide with one end on a hot plate and the other end on a cold block. No attempt was made to control the pH of the solutions during this process. The first method (a) produced randomly oriented crystals. However, in the second case (b), a highly oriented series of crystals were produced if the films were thin enough. All these films were examined under an optical microscope a well as a scanning electron microscope and X-ray camera. They also exhibited SHG behaviour.

The piezoelectric properties of the KDP/PEO composite were also investigated. It was found that a voltage was induced when a sharp stress was applied to the film and that this was dependent upon the percentage by weight of KDP or ADP in the composite.

EXAMPLE 3

2-Methyl-4-nitroaniline (MNA), and 3-nitroaniline (mNA) were dissolved in toluene in various proportions with either polymethylmethacrylate or polystyrene. Films were cast by dipping a microscope slide into the solution and allowing the solvent to evaporate at 60° C. These films were all 5+/−1 micrometers in thickness.

Composites of potassium dihydrogen phosphate and of ammonium dihydrogen phosphate in polyethyleneoxide were prepared by evaporation of aqueous solutions. These films were 100 micrometers thick.

EXAMPLE 4

Preparation by a melt pressing technique was used in the production of composites of 3-nitroaniline in the crystalline polymer poly(ethylene oxide) (mNA/PEO). Powders of PEO and mNA were thoroughly mixed in various proportions before they were placed with 500 micrometers thick spacers between aluminium sheets. The sheets were then placed between the platens of a hot press, which were held at 150° C., and left there to obtain the temperature of the press. Once the powders had started to melt they were pressed with a force of 5 tonnes over a sample area of ca 100 cm$^2$. After pressing the composite and sheets were removed from the press and quenched in liquid nitrogen.

Once qenched the PEO was removed from the sheets and left to warm to room temperature before being cut into strips and repressed to ensure a homogeneous composite.

EXAMPLE 5

Using a solvent evaporation from a swelled polymer technique mNA was incorporated into the highly crystalline polymers, linear low density polyethylene (LDPE), polypropylene (PP) and polyethylene oxide (PEO).

Composites of mNA in LDPE were prepared by swelling pressed sheets of LDPE with a hot solution of mNA in xylene. The concentration of mNA in xylene was such that it produced a saturated solution at 60° C. Thus on taking out the swollen LDPE from the hot solution the polymer loss the xylene through evaporation while at the same time cooling. The result of both these processes was that the concentration of mNA in the polymer increased such that it exceeded the saturation limit and so began to precipitate. The mNA crystallised almost instantaneously in the LDPE on removal from the solution.

From the preliminary experiments in solvent evaporation from swelled polymers it was found that the temperature of the swelling solution was critical in determining the success of composite preparation. Too low a temperature did not sufficiently swell the polymer to enable enough mNA to be incorporated into the polymer to exceed the solid solubility saturation limit to enable precipitation within the drying polymer. Too high a temperature caused the polymer to either swell excessively giving handling difficulties or caused the polymer to dissolve.

Composites of mNA in LDPE were prepared over a temperature range 60°-100° C. by holding LDPE strips (400 micrometers thick) in hot solutions for 5 minutes and then leaving the swelled polymer to cool to ambient while also losing the xylene. After drying for 24 hours fracture surfaces of the composites were prepared by freezing the material in liquid nitrogen and mechanically breaking the composite. These fracture surfaces were then investigated with the scanning electron microscope (SEM).

Incorporating mNA into polypropylene was achieved by placing a similar sized strip of PP into a refluxing solution of mNA in xylene. The solution had the same concentration of mNA as in the mNA/LDPE swelling experiments. Again the polymer was left in the solution for 5 minutes before being pulled out and left to dry at ambient conditions. It was observed that mNA crystallized almost instantaneously in the PP once the swollen polymer was removed from the solution.

Similar techniques were used to prepare samples of mNA in poly(ethylene oxide). To prevent the PEO from dissolving PEO strips were held in a solution of mNA in xylene at a range of temperatures 49°-37° C. for 30 minutes. In this case mNA crystals started to grow in the polymer at approximately 30 minutes after the swollen polymer was removed from the solution. The concentration of mNA in xylene in this case was such as to produce a saturated solution at 37° C. Again fracture surfaces were prepared for SEM examination.

Figure 2:
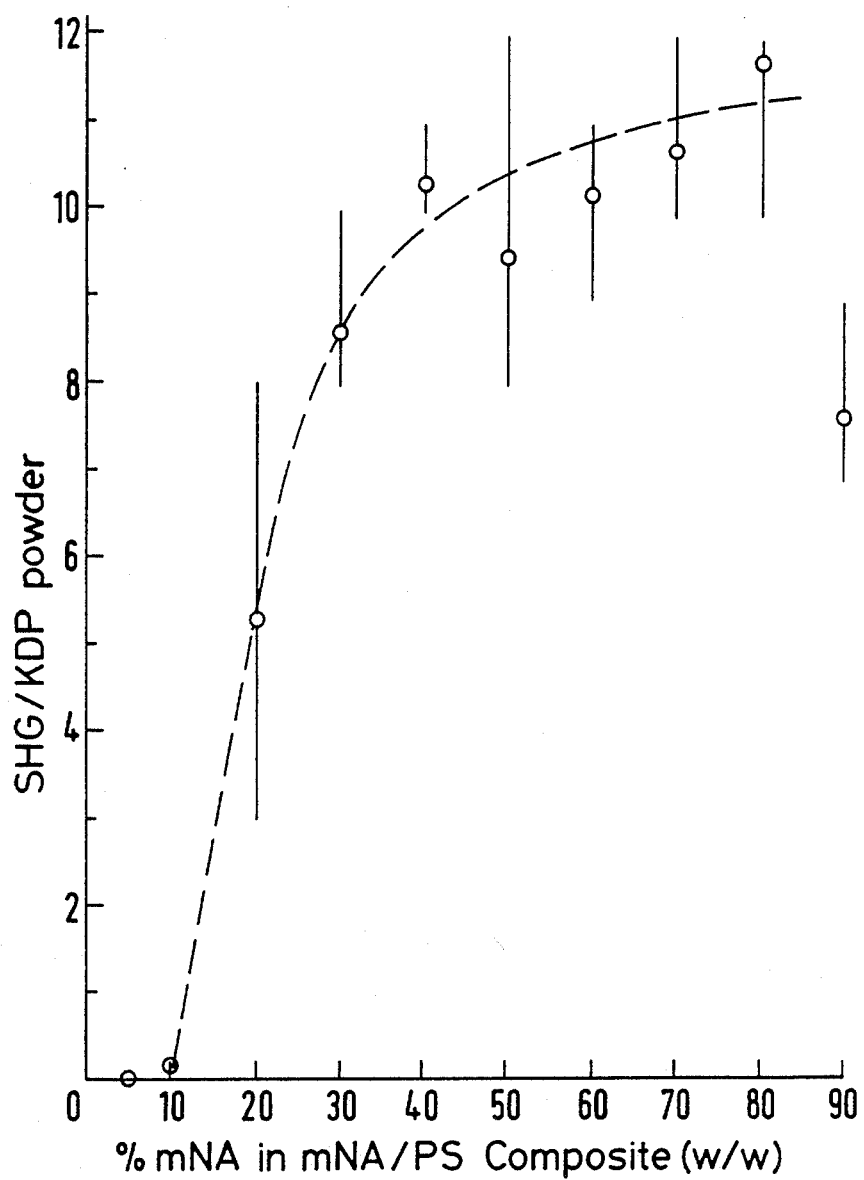
FIG. 2 is a plot of SHG/potassium dihydrogenorthophosphate (SHG/KDP) versus % 3-nitroaniline (mNA) in mNA/polystyrene (mNA/PS) composite showing SHG output from composites of 3-nitroaniline in polystyrene (PS)
Figure 3:
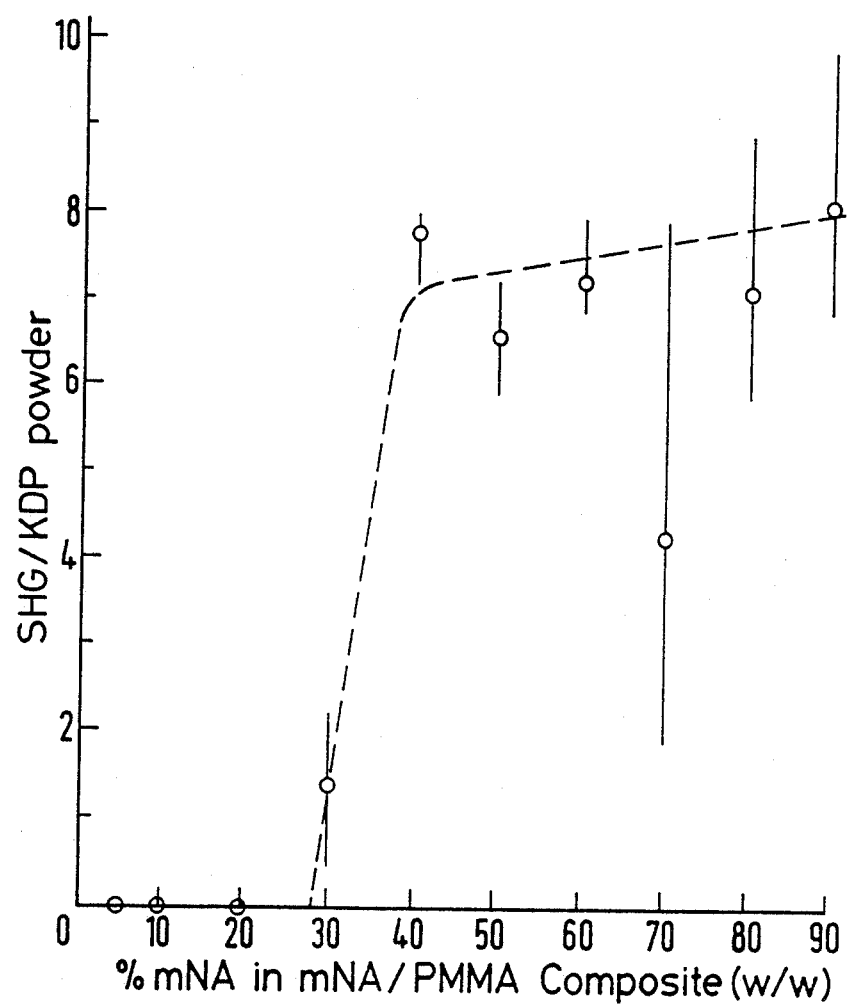
FIG. 3 is a plot of SHG/KDP powder versus % mNA in mNA/polymethylmethacrylate (mNA/PMMA) composite showing SHG output from composites of 3-nitroaniline in polymethylmethacrylate (PMMA)

FIGS. 2 and 3 show the SHG output from composites of 3-nitroaniline in polystyrene and in polymethylmethacrylate. In each case the intensity was zero up to some critical concentration above which it rose steeply and then levelled off. Microscope examination showed that the critical level corresponded to that at which crystals first appeared in the polymer and hence to the solubility of the nitroaniline in the polymer. This onset of SHG in the composite was 8±3% w/w in polystyrene and 27±3% w/w in polymethyl methacrylate. From microphotographs this loading was found to correspond to the onset of crystal precipitation of the mNA in the polymer which is to be expected since SHG occurs from the non-centrosymmetric mNA crystals.

The absolute measurement of SHG intensities was difficult but it is customary to compare compounds to a simple reference material. The values quoted are therefore relative to intensities measured on powders of potassium dihydrogen phosphate and are measured in transmission (180°).

Figure 4:
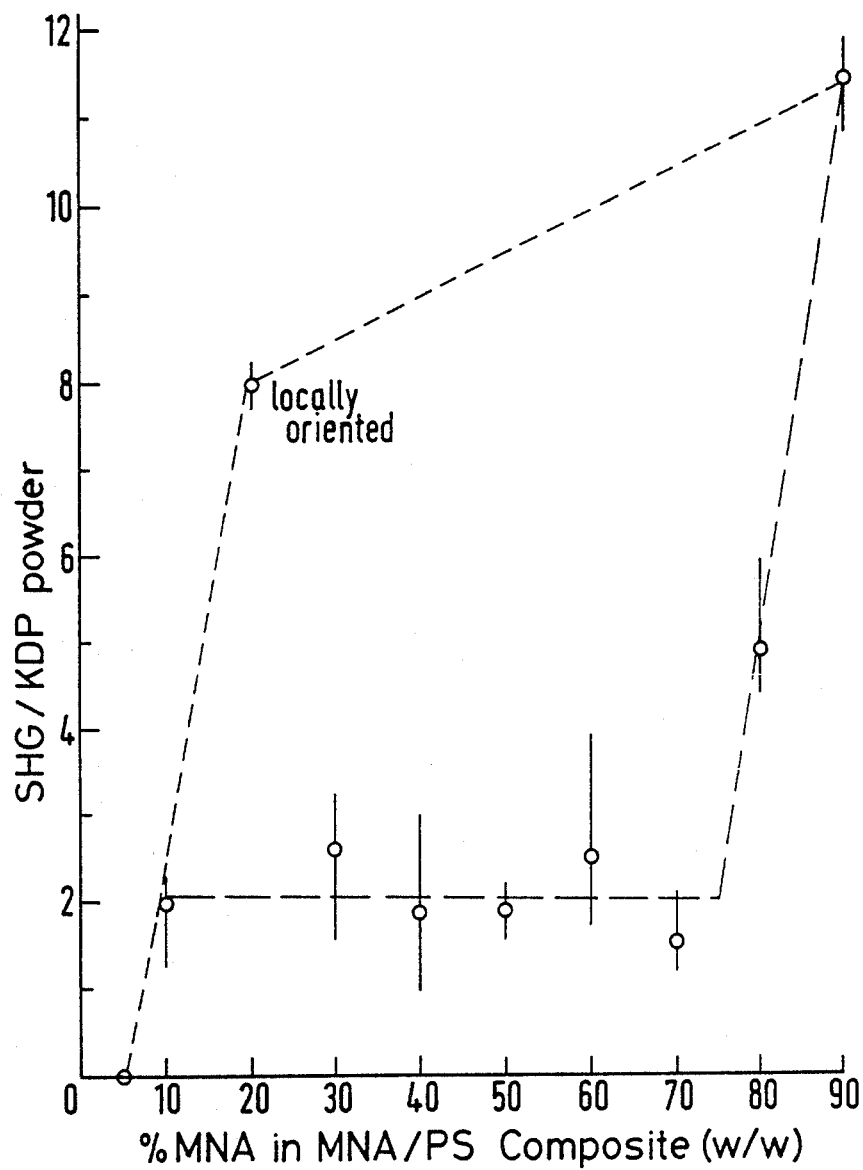
FIG. 4 is a plot of SHG/KDP powder versus % 2-methyl-4-nitroaniline (MNA) in MNA/PS composite showing concentration dependence of SHG from films containing MNA in PS.
Figure 5:
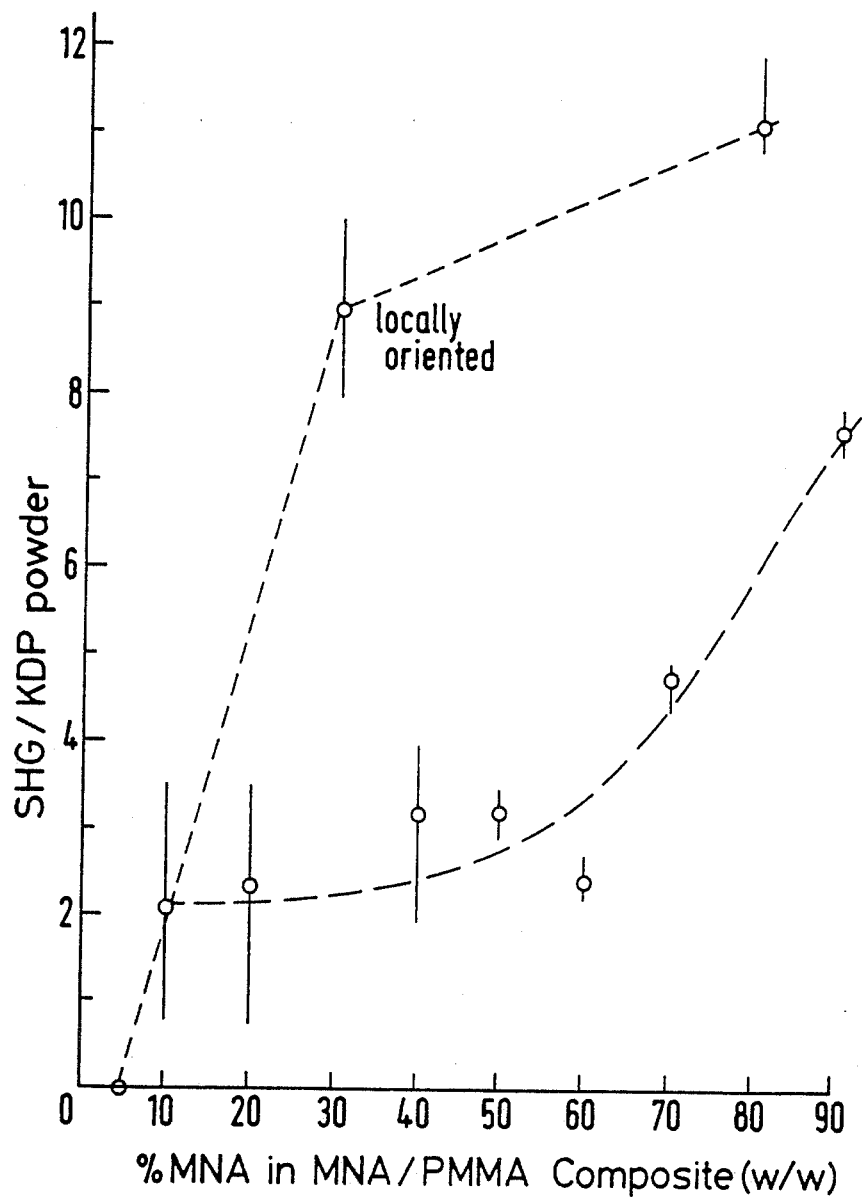
FIG. 5 is a plot of SHG/KDP powder versus % MNA in MNA/PMMA composite showing concentration dependence of SHG from films containing MNA in PMMA.

FIGS. 4 and 5 show the concentration dependence of SHG from films containing MNA in polystyrene or polymethylmethacrylate. The solubility of this material was lower and so the concentration at which SHG starts was also quite small. The pattern of the intensity change was also quite different in that the emission rose to a plateau and then rose again at high concentrations. By optical microscopy we observed a different pattern of crystallization for MNA as compared to mNA. In MNA the crystals appeared as a fine mat of unoriented particles with a size range on the limit of resolution, less than 1 micron. In mNA the crystals had the form of larger needles of about 10 microns × 1 mm which were arranged in spherulites. These large spherulites gave the samples an overall high level of local orientation and we believe that this caused the initially rapid rise in SHG with concentration. With both mNA and MNA there was a considerable scatter in the results which arose from morphology differences between different points on the films. As shown in FIGS. 4 and 5 higher values of SHG emission in the forward (180°) direction were associated with regions where the structure shows local orientation. The maximum level of SHG emission was similar to that observed from the powdered nitroanilines alone.

Figure 6:
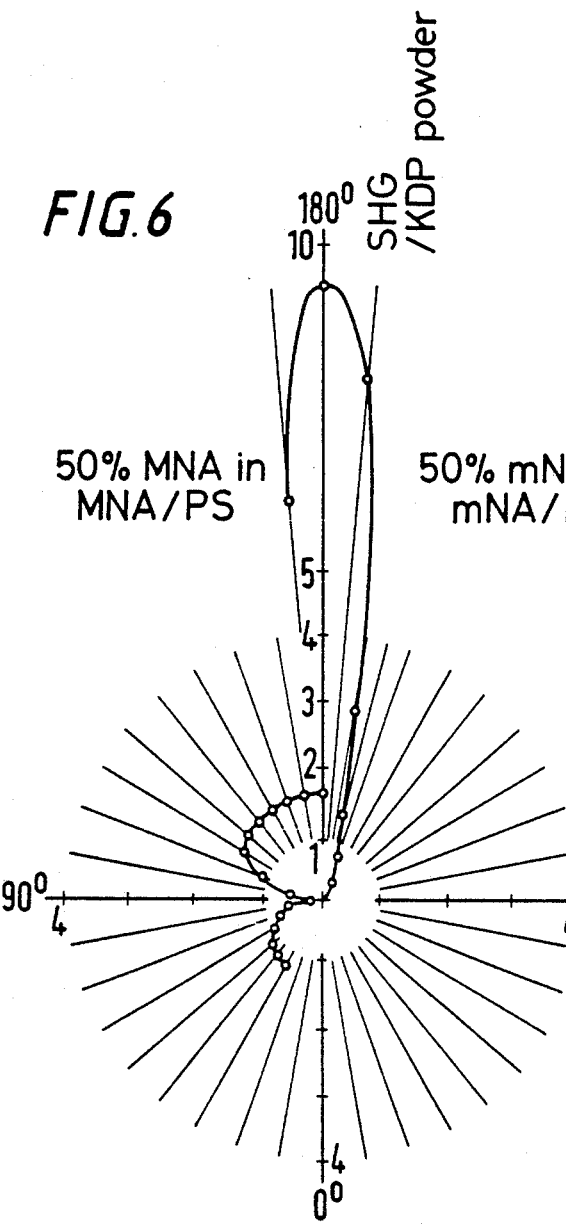
FIG. 6 is a radial plot showing the angular dependence of SHG for MNA/ and mNA/ PS composites.
Figure 7:
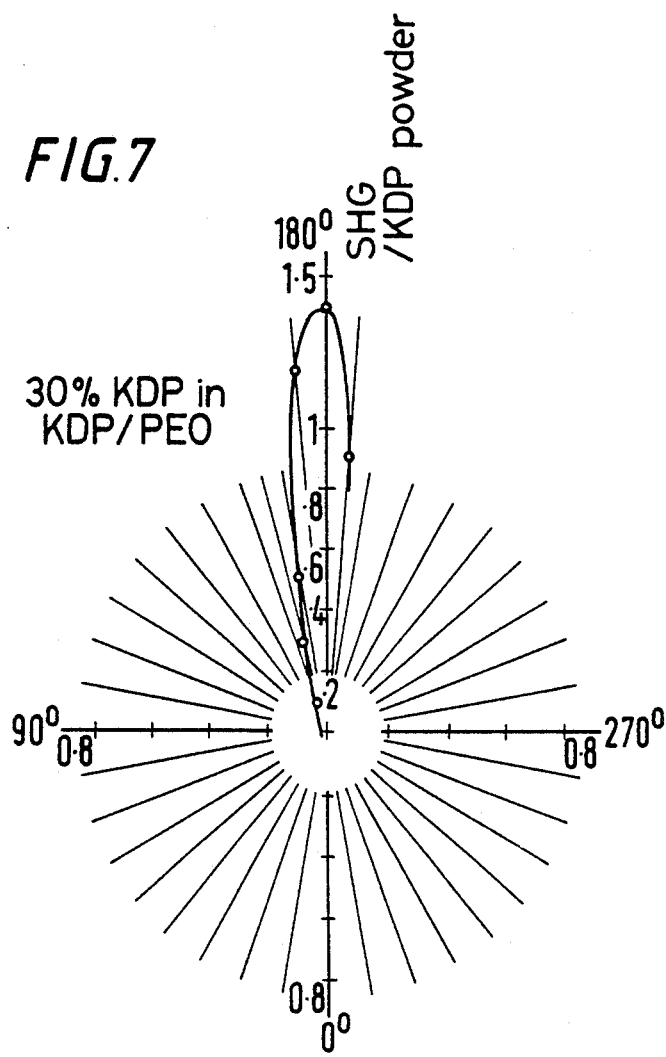
FIG. 7 is a radial plot showing the angular dependence of SHG for KDP/poly(ethylene oxide) (KDP/PEO) composite.

The refractive index of i.e. the nitroanilines was about 1.8 whilst that of the embedding polymer was close to 1.5 so the refractive index match was poor. With a good refractive index match most of the second harmonic is concentrated in the forward direction and close to the main beam. Nonetheless we found that with mNA the emission was quite strongly concentrated in the forward direction while with MNA the SHG was distributed over two lobes as shown in FIG. 6. We believe that this arose because the mNA crystals grew as parallel fibres not as uncorrelated powders. A similarly narrow lobe of SHG emission was seen in a parallel crystal array system of Potassium Dihydrogen Phosphate-Polyethyleneoxide (FIG. 7).

Figure 8:
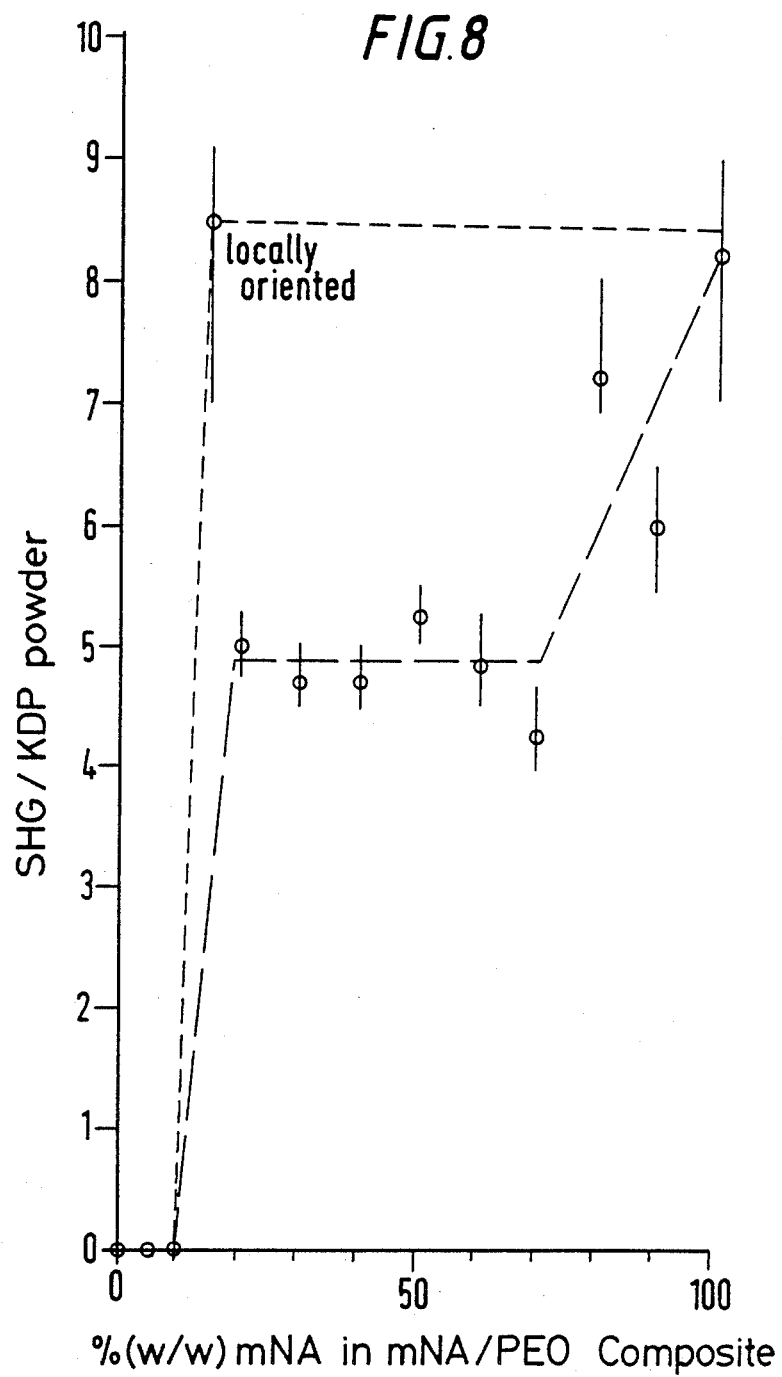
FIG. 8 is a plot of SHG/KDP powder versus % w/w mNA/PEO composites showing the SHG intensity dependence upon mNA added to crystalline PEO; and, FIG. 9 is a radial plot showing the angular dependence of SHG for mNA/PEO composites.

The SHG intensity dependence upon mNA added to the crystalline polymer PEO using the melt pressing technique is shown in FIG. 8. It is seen that the relationship is similar to that obtained in the MNA/PS and MNA/PMMA composite systems with a plateau in SHG intensity rising to a higher value only at large inclusions of organic SHG material. In this system the origin of SHG occurs at 10 wt % mNA. Again a single high SHG value is seen at a low concentration of nitroaniline. Optical examination revealed a locally oriented structure in this composite while the other compositions revealed a dense finely crystalline structure although the thickness of PEO composites.

Figure 9:
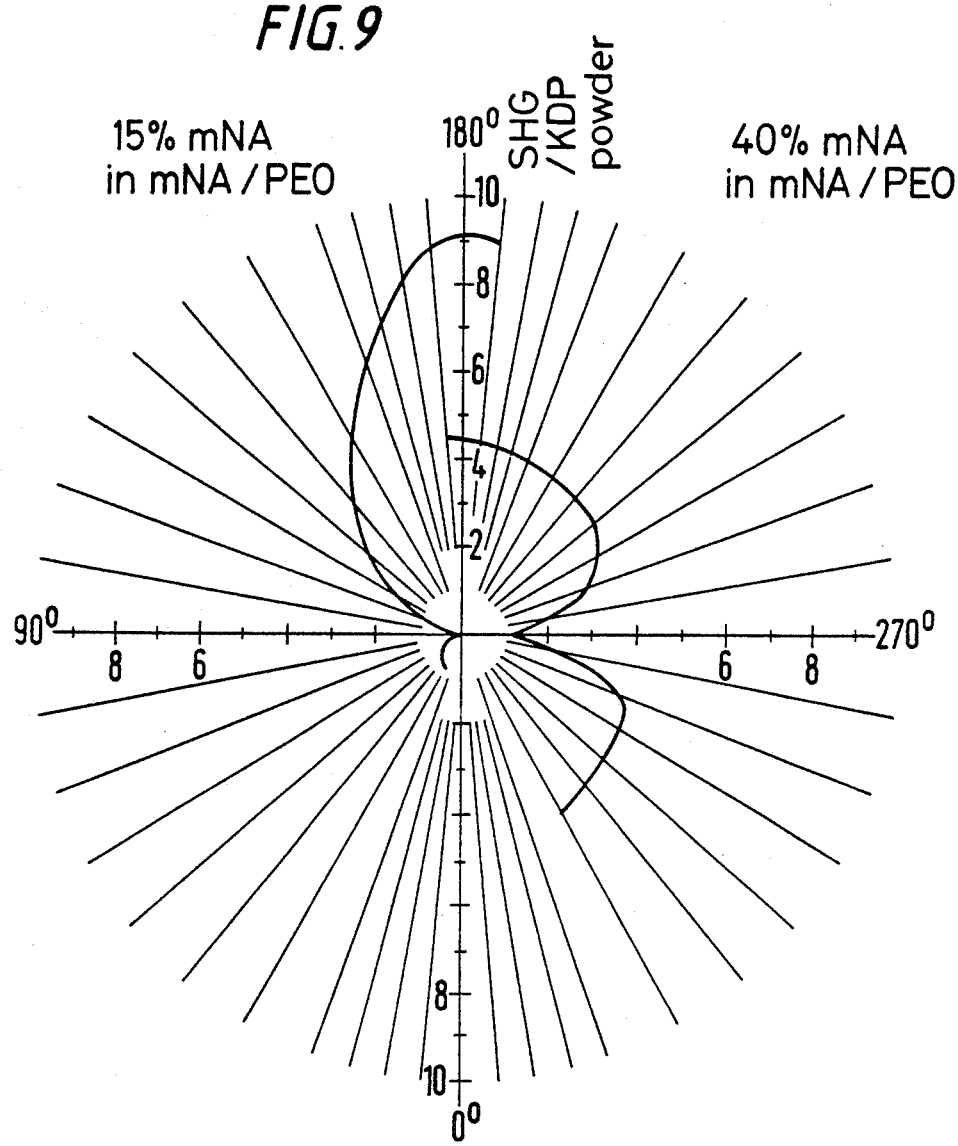

Radial plots of all the mNA/PEO composites were obtained and apart from the 15 wt % mNA composite all showed the characteristic 'figure of eight' relationship. The 15 wt % mNA composite gave a large forward direction plot. Radial plots of 15 and 40 wt % mNA in mNA/PEO composites are shown in FIG. 9.

Preliminary measurements of the SHG from composites prepared by the solvent evaporation from a swelled polymer technique were obtained. Composites of mNA in LDPE prepared by holding the LDPE in the 88° C. solution for 5 minutes gave an SHG output, after cleaning the surface with acetone, 5 times that of the reference KDP powder.

We claim:

1. A polymer matrix having grown therein in vitro and in situ, non-centrosymmetric crystals of an organic or inorganic compound capable of forming such crystals.

2. A polymer matrix according to claim 1 wherein the non-centrosymmetric crystals are oriented within the polymer matrix.

3. A polymer matrix according to claim 1 wherein the polymer is selected from polystyrene, polyethylene, polypropylene, polymethylmethacrylate, ethylene-ethylacrylate copolymer, polyvinylchloride, polyvinylidene fluoride and a polyoxyalkylene oxide.

4. A polymer matrix according to claim 1 wherein said matrix is in film form.

5. A polymer matrix according to claim 1 wherein the compound capable of forming non-centrosymmetric crystals form such crystals under ambient conditions.

6. A polymer matrix according to claim 1 wherein the organic compound capable of forming non-centrosymmetric crystals is selected from 3-nitroaniline, 3-methyl-4-nitropyridine-1-oxide, 2-methyl-4-nitroaniline, urea and 2-4-dinitroaniline.

7. A polymer matrix according to claim 1 wherein the inorganic compound capable of forming non-centrosymmetric crystals is selected from potassium dihydrogen orthophosphate, ammonium dihydrogen orthophosphate, lithium niobate, barium sodium niobate, lithium iodate and silicon dioxide.

* * * * *

REEXAMINATION CERTIFICATE (1295th)

United States Patent [19]

Calvert et al.

[11] B1 4,806,579

[45] Certificate Issued May 29, 1990

[54] POLYMER COMPOSITES

[75] Inventors: Paul D. Calvert, Lewes; Raymond M. Ellul, Blackboys; Brian D. Moyle, Lewes, all of England

[73] Assignee: British Petroleum Co., London, England

Reexamination Request:
No. 90/001,908, Dec. 7, 1989

Reexamination Certificate for:
Patent No.: 4,806,579
Issued: Feb. 21, 1989
Appl. No.: 7,002
Filed: Jan. 23, 1987

[30] Foreign Application Priority Data

Jan. 30, 1986 [GB] United Kingdom ............... 8602318
May 20, 1986 [GB] United Kingdom ............... 8612283

[51] Int. Cl.$^5$ .................. C08K 5/34; C08K 5/21; C08K 3/32; C08K 3/10

[52] U.S. Cl. ................... 524/99; 428/323; 524/211; 524/216; 524/259; 524/401; 524/408; 524/414; 524/416; 156/600; 264/291

[58] Field of Search ............... 524/259, 211, 216, 99, 524/408, 401, 414, 416; 428/323, 910, 913

[56] References Cited

U.S. PATENT DOCUMENTS

4,746,577  5/1988  Pantelis et al. ................ 428/421
4,748,074  5/1988  Pantelis et al. ................ 428/220

FOREIGN PATENT DOCUMENTS

0186999  7/1986  European Pat. Off. .

OTHER PUBLICATIONS

Meredith et al.; Optical and Nonlinear Optical Characterizations of Molecularly Doped Thermotropic Liquid Crystalline Polymers; *Macromolecules* 1982, 15, No. 5, pp. 1385-1389, 1982.

*Primary Examiner*—L. T. Jacobs

[57] ABSTRACT

A polymer matrix has grown therein in vitro and in situ non-centrosymmetric crystals of organic or inorganic compounds. The crystals are preferably orientated and may be used in electro-optical systems.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *